(12) United States Patent
Arad

(10) Patent No.: US 7,898,959 B1
(45) Date of Patent: Mar. 1, 2011

(54) METHOD FOR WEIGHTED LOAD-BALANCING AMONG NETWORK INTERFACES

(75) Inventor: Carmi Arad, Nofit (IL)

(73) Assignee: Marvell Israel (MISL) Ltd., Yokneam (IL)

( * ) Notice: Subject to any disclaimer, the term of this patent is extended or adjusted under 35 U.S.C. 154(b) by 92 days.

(21) Appl. No.: 12/165,344

(22) Filed: Jun. 30, 2008

Related U.S. Application Data

(60) Provisional application No. 60/946,787, filed on Jun. 28, 2007.

(51) Int. Cl.
*H04L 12/26* (2006.01)

(52) U.S. Cl. ............... 370/235; 370/389; 709/232; 709/241

(58) Field of Classification Search ............... None
See application file for complete search history.

(56) References Cited

U.S. PATENT DOCUMENTS 7,190,696 B1* 3/2007 Manur et al. ............ 370/392
2008/0291826 A1* 11/2008 Licardie et al. ............ 370/230
2008/0298236 A1* 12/2008 Ervin et al. ............ 370/232

OTHER PUBLICATIONS

Broadcom, BCM5695 Product Brief, Multilayer 12-port Gigabit Ethernet Stackable Switch, 2004.*
Thaler, D. et al., RFC 2991, "Multipath Issues in Unicast and Multicast Next-Hop Selection", Nov. 2000, 9 pages.
Hopps, C., RFC 2992, "Analysis of an Equal Cost Multi-Path Algorithm," Nov. 2000, 8 pages.

* cited by examiner

*Primary Examiner*—Seema S Rao
*Assistant Examiner*—Khoa Huynh

(57) ABSTRACT

A logical load-balancing method for distributing traffic according to a set of weights among a group of network interfaces. A logical identity of a packet may be generated, e.g., by generating a hash index of the packet's header. Each of the weights may be associated with a network interface. A range of logical identities, or its boundary, may be determined for an interface according to the weight associated with the interface member. A packet may be directed to an interface if the packet's logical identify falls into the range of the interface.

19 Claims, 4 Drawing Sheets

METHOD FOR WEIGHTED LOAD-BALANCING AMONG NETWORK INTERFACES

CROSS REFERENCE TO RELATED APPLICATION

This application claims the benefit of priority to previously filed U.S. provisional patent application Ser. No. 60/946,787, filed Jun. 28, 2007, entitled WEIGHTED LOAD BALANCING IN A TRUNK GROUP. That provisional application is hereby incorporated by reference in its entirety.

BACKGROUND

1. Field of the Invention

The present invention relates generally to load balancing among network interfaces and more particularly to load-balancing in an LAG (Link Aggregation Group or a trunk), Weighted Cost Multipath Routing (WCMP) and Transparent Interconnection of Lots of Links (TRILL).

2. Description of Related Art

LAG, described in IEEE Standard 802.3ad, is a network data transmission method which groups a number of physical links or ports into a single logical entity and treats the physical links or ports as one single logical entity. The logical entity is called an LAG, a physical link or port is called an LAG member, and network traffic is distributed among the LAG members. As shown in FIG. 1, physical ports of a device may be divided into N logical groups (e.g., LAG 0, LAG 1, . . . LAG N−1), and each LAG may include m ports (e.g., 0-15). By combining several physical links or ports together, an LAG may increase data transmission speed, and provide redundancy.

Weighted-cost multi-path routing (WCMP) is a routing strategy where next-hop packet forwarding to a single destination can occur over multiple "best paths" which tie for top place in routing metric calculations. It potentially offers substantial increases in bandwidth by load-balancing traffic over multiple paths Transparent Interconnection of Lots of Links (TRILL) is a forwarding policy that provides shortest-path frame routing in Ethernet networks. In particular it supports load-splitting among multiple paths. The following discussion takes load balancing among LAG members as an example, but it equally applies to WCMP and TRILL applications as can be appreciated by an ordinarily skilled person in the art.

FIG. 1 illustrates a load-balancing method according to this approach, wherein the traffic is load-balanced among LAG members according to a set of weights. In the example shown, the LAG has 4 members, the weights are 1:2:4:8 for LAG members 0, 1, 2 and 3 respectively, and 15 LAG members may be used to realize the weights. In other words, for each 15 packets, one packet is required to go to LAG member 0, two packets are required to go to LAG member 1, four packets are required to go to LAG member 2, and eight packets are required to go to LAG member 3. As shown, at 101, a destination LAG of a packet may be determined from the packet header or the switch configuration. In the example shown, the LAG number is LAG 1. At 102, information about LAG 1 may be obtained from an LAG Attributes Table, e.g., the number m of LAG members that the LAG 1 has. In one example, m=15 and the LAG Member Table may accommodate up to 16 members. At 103, a hash index h may be generated from the header of the packet. In one example, the hash index's width may be 8 bits and its value may be between 0 and 255. At 104, a modulo operation may be performed to obtain the remainder of division of h by m, and the remainder may be used as an LAG member number. When h is between 0 and 255 and m=15, the remainder of division of h by m may change from 0 to 14. At 105, LAG members may be physically replicated proportionally to their weights, and LAG members 0-14 in the LAG Member Table may become one LAG member 0, two LAG member 1s, four LAG member 2s and eight LAG member 3s.

One problem with this approach is its small dynamic range of weights and ratio between weights, since the sum of the weights cannot exceed the number of LAG members an LAG has, which is 16 in this example. One way to increase the weight dynamic range would be to increase the number of members in the LAG. However, increasing the number of LAG members would require larger table. It may also make the modulo operation more complicated.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a logical load-balancing method in an LAG for distributing traffic according to a set of weights. A logical identity of a packet may be generated, e.g., by generating a hash index of the packet's header. Each of the weights may be associated with a LAG member. A range of logical identities, or its boundary, may be determined for a LAG member according to the weight associated with the LAG member. A packet may be directed to an LAG member if the packet's logical identity falls into the range of the LAG member. The invention may be carried out by computer-executable instructions, such as program modules. Advantages of the present invention will become apparent from the following detailed description.

Figure 2:
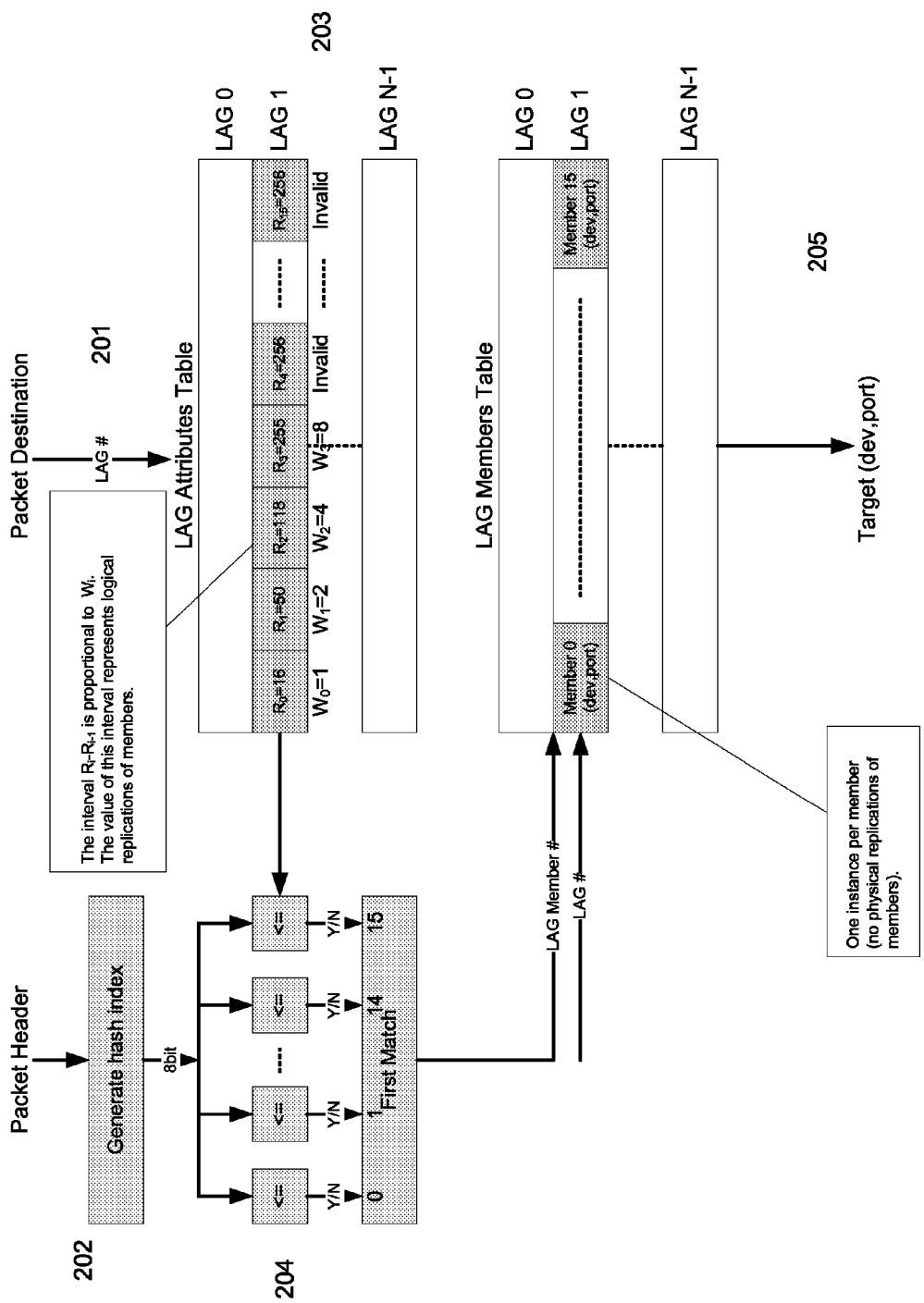
FIG. 2 illustrates a logical load-balancing method according to one embodiment of the present invention.

FIG. 2 illustrates a logical load-balancing method according to one embodiment of the present invention. As shown, physical ports of a device may be divided into N logical groups (e.g., LAG 0, LAG 1, . . . LAG N−1), each LAG may include 16 ports (e.g, 0-15), and packets need to be distributed among LAG members 0-3 according to a set of weights 1:2:4:8.

At 201, an LAG number may be determined, e.g., from the header of a packet. In the embodiment shown, the LAG number is LAG 1.

At 202, a logical identity of a packet may be determined. In one embodiment, the logical identity of a packet may be a hash index h of the header of the packet. The logical identity may be other values obtained with other methods. In the embodiment shown in FIG. 2, the hash index width may be 8 bits and the hash index h may be between 0 and 255.

At 203, the set of weights may be associated with LAG members of LAG 1 and stored in an LAG Attributes Table. As shown, the weight $W_0=1$ may be associated with the LAG member 0, the weight $W_1=2$ may be associated with the LAG member 1, the weight $W_2=4$ may be associated with the LAG member 2, and the weight $W_3=8$ may be associated with the LAG member 3. The weights represent that the traffic will be load-balanced among LAG members 0, 1, 2, and 3 according to the 1:2:4:8 ratio.

Also at 203, a range may be determined for each LAG member according to the LAG member's weight and stored in the LAG Attributes Table. In one embodiment, a boundary value $R_i$ may be calculated for each LAG member, wherein i=0, 1, 2, . . . 15. In one embodiment, $R_i$ may be calculated according to the following equation:

$$R_i = R_{i-1} + W_i * 2^n / W \quad (1)$$

wherein i is the LAG member number 0, 1, 2, . . . 15;

$R_i$ is a boundary value associated with an LAG member;

$W_i$ is a weight associated with an LAG member;

n is the hash index width;

W is the sum of all $W_i$'s associated with valid LAG members; and $R_{-1} = -1$ When n=8, W=15, values of $R_0$-$R_3$ may be obtained as follows, using $W_i$ stored in the LAG Attributes Table:

$$R_0 = R_{-1} + W_0 * 2^n / W = -1 + 1 * 256/15 = 16.07 \approx 16 \; (R_0\text{'s range is 0-16)};$$

$$R_1 = R_0 + W_1 * 2^n / W = 16.07 + 2 * 256/15 = 50.2 \approx 50;$$

$$R_2 = R_1 + W_2 * 2^n / W = 50.2 + 4 * 256/15 = 118.46 \approx 118; \text{ and}$$

$$R_3 = R_2 + W_3 * 2^n / W = 118.46 + 8 * 256/15 = 254.99 \approx 255$$

According to the equation (1), $R_i - R_{i-1} = W_i * 2^n / W$. Since W, as the sum of all $W_i$'s associated with valid LAG members, and n, as the width of the hash index, are constants to all LAG members, the difference between $R_i - R_{i-1}$, or the number of logical identities assignable to an LAG, is proportional to $W_i$. For example, $$R_1 - R_0 = 50 - 16 = 34, \text{ while } W_1 = 2;$$

$$R_2 - R_1 = 118 - 50 = 68, \text{ while } W_2 = 4; \text{ and}$$

$$R_3 - R_2 = 255 - 118 = 137, \text{ while } W_3 = 8$$

It should be understood that other equations may be used to calculate the range or its boundary, as long as it makes the number of logical identities assignable to an LAG member approximately proportional to the weight associated with the LAG member.

At 204, it may be determined which range of logical identities the hash index h of a packet falls into. In one embodiment, the hash index h may be compared with the values of $R_i$ from the LAG Attributes Table to find out the smallest $R_i$ value which is not smaller than h. The comparison may start from $R_0$. If $h \leq R_0$, then LAG member 0 may be selected as the LAG member for passing the data packet. If h is bigger than $R_0$, h may be compared with $R_1$. If $h \leq R_1$, then LAG member 1 may be selected as the LAG member for passing the data packet. The process may continue until an LAG member is selected for the packet.

Alternatively, the lower end boundary may be inclusive, but the upper end boundary may be exclusive, and the hash index h of a packet may be compared with the values of $R_i$ from the LAG Attribute Table to find out the smallest $R_i$ value which is bigger than h. If $h < R_0$, then LAG member 0 may be selected as the LAG member for pass the data packet. Otherwise, h may be compared with $R_1$, $R_2$, . . . until an LAG member is selected for the packet.

In one embodiment, instead of storing boundary values in the LAG Attributes Table, the range of logical identities assignable to an LAG member may be stored at 203. For example, the ranges may be 0-16 for the LAG member 0, 17-50 for the LAG member 1, 51-118 for the LAG member 2, and 119-255 for the LAG member 3.

At 205, the packet may be directed to the selected LAG member.

Figure 1:
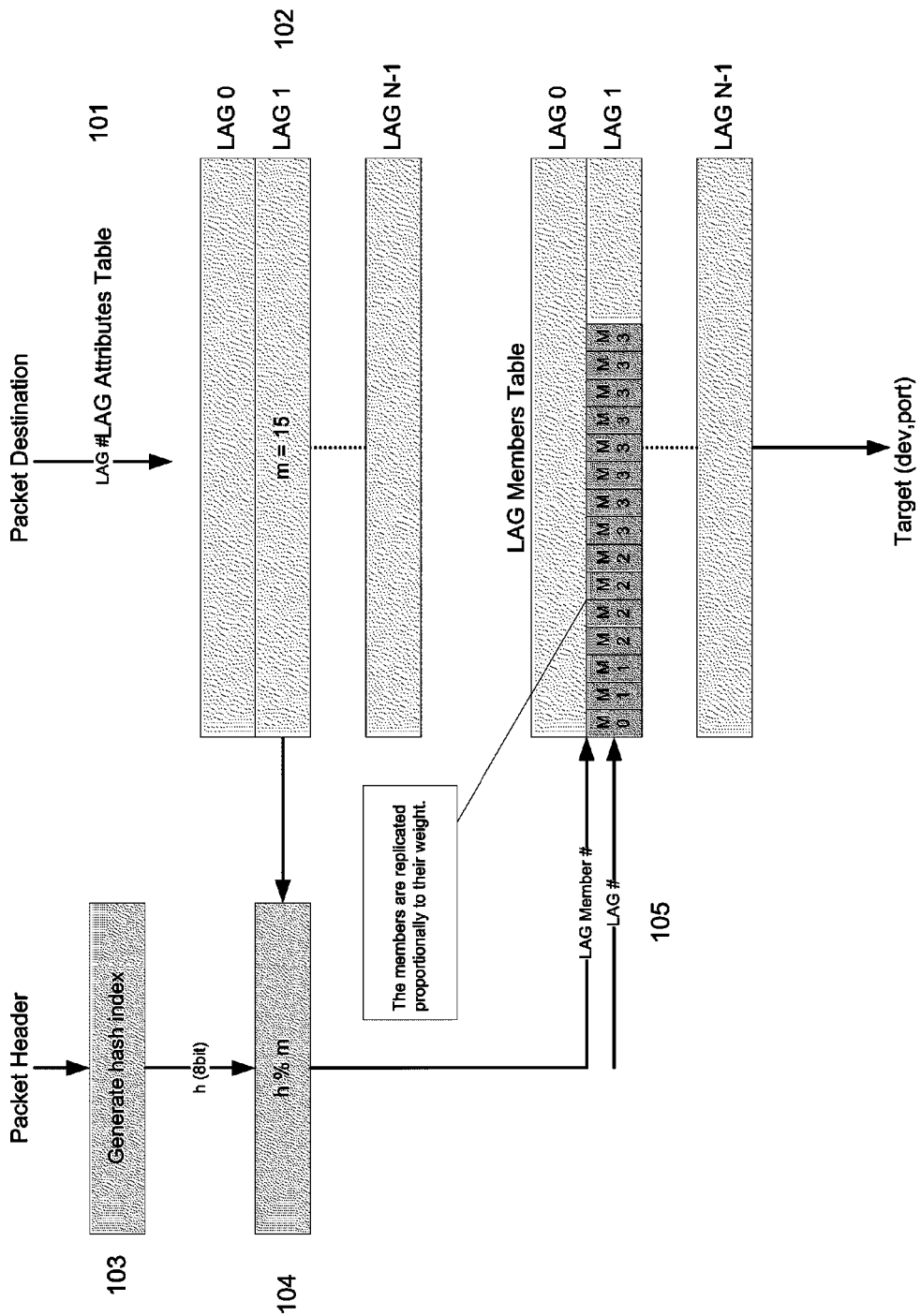
FIG. 1 illustrates a prior art load-balancing method in an LAG which distributes data packets among LAG members according to a set of weights.

Thus, for the same set of weights, the dynamic range of the method shown in FIG. 2 is 0-255, significantly larger than 15, the dynamic range of the method shown in FIG. 1. In addition, by logically load-balancing the traffic, reconfiguration of hardware may be avoided.

It should be understood that FIG. 2 is used to explain the method of the present invention, instead of limiting the sequence of the steps. The steps may be performed in any sequence which does not require a subsequent step to go first. As just one example, 202 may be performed before 201 or at the same time with 201.

Figure 3:
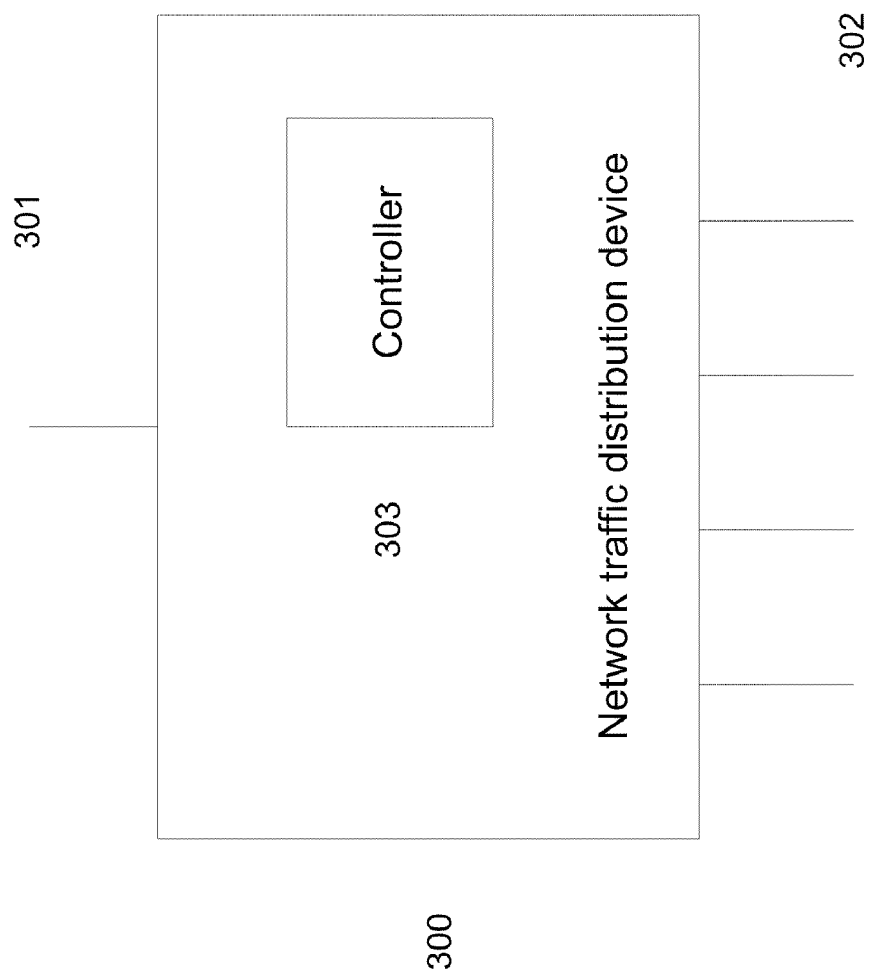
FIG. 3 illustrates a network traffic distributing device according to one embodiment of the present invention.

FIG. 3 illustrates a network traffic distributing device according to one embodiment of the present invention. The network traffic distributing device 300 may be a switch or a router. The network traffic distributing device 300 may have one or more input ports 301, and a number of output ports 302. A controller 303 may distribute network traffic received at the input ports 301 to the output ports 302 using the method shown in FIG. 2.

Figure 4:
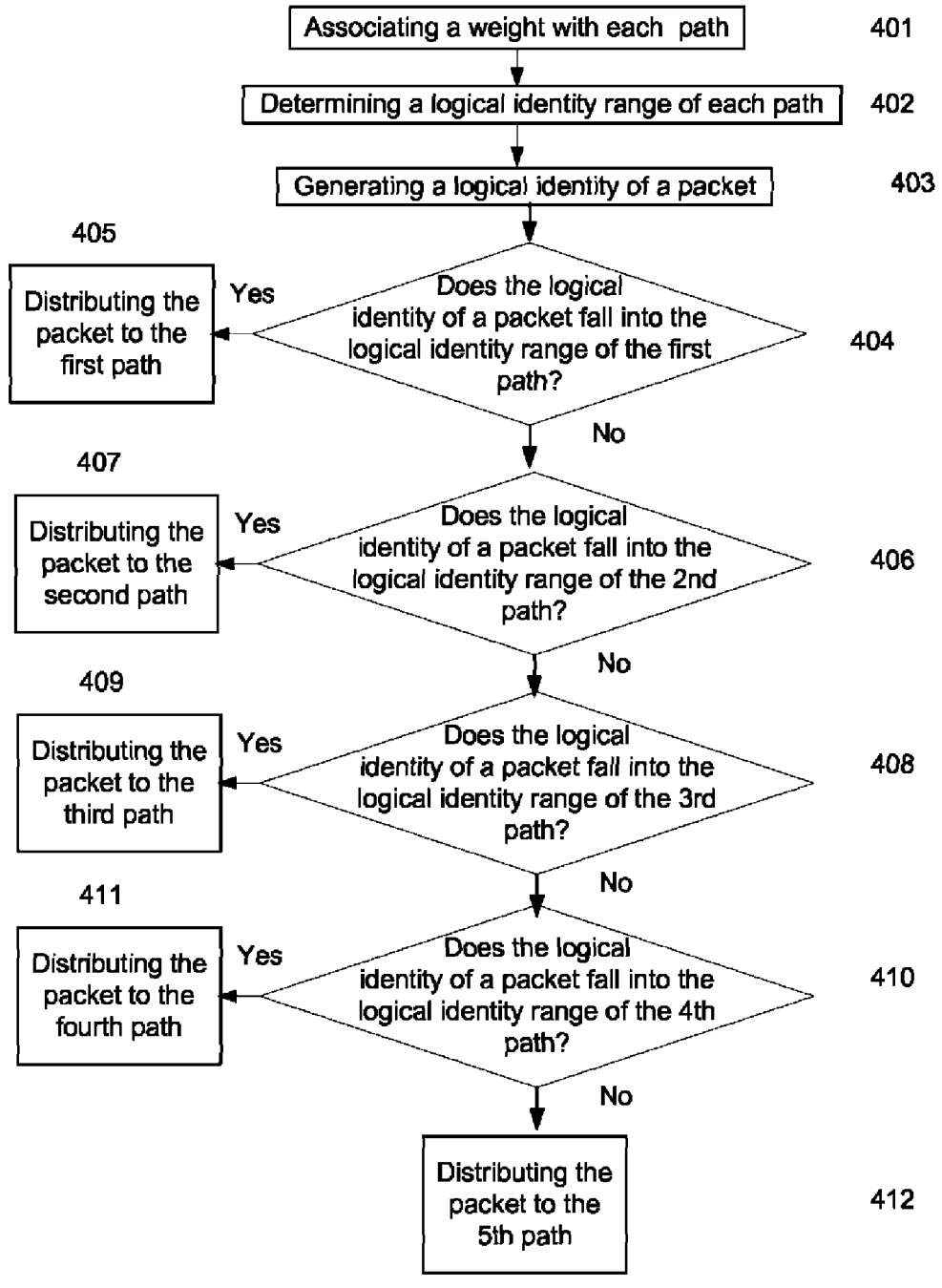
FIG. 4 illustrates a WCMP/TRILL selection method according to one embodiment of the present invention.

The method of the present invention may be used in other applications in which weighted selection between multiple choices is needed. Examples of such applications are Weighted Cost Multipath (WCMP) or Transparent Interconnection of Lots of Links (TRILL) selection, which performs load balancing among multiple paths in a network according to a set of weights, each of which may represent a percentage of network traffic that is to be assigned to a path. FIG. 4 illustrates a WCMP/TRILL selection method according to one embodiment of the present invention. In this embodiment, traffic needs to be distributed among paths 0-4 according to weights 1:8:4:1:2. At 401, a weight value may be associated with its corresponding path, e.g., the weight value 1 with the path 0, the weight value 8 with the path 1, the weight value 4 with the path 2, the weight value 1 with the path 3 and the weight value 2 with the path 4. At 402, a range of logical identities may be determined for each path using the equation (1) and the weights. The logical identity may be, e.g., a hash index of a packet's header. At 403, a logical identity may be generated for each packet. At 404, it may be determined whether the logical identity of a packet falls into the logical identity range of the first path. If yes, the packet may be assigned to the first path at 405. Otherwise, at 406, it may be determined whether the logical identity of the packet falls into the logical identity range of the second path. If yes, the packet may be assigned to the second path at 407. 404 and 405 may repeat at 408-412 until the packet is assigned to a path. The process may return to 403. In one embodiment, 401 and 402 may be performed in the "Group of Paths" set-up, or the "Group of Paths" creation/initialization process, and the rest of the process may be performed on per packet basis when traffic flows through the established path.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A method for load-balancing traffic in a Link Aggregation Group (LAG) which comprises a plurality of LAG members, the method comprising:
   generating a logical identity of a packet;
   associating a weight with each LAG member, the weight corresponding to a percentage of network traffic that is to be assigned to the LAG member, wherein a weight associated with a first LAG member is different from a weight associated with a second LAG member;
   determining a range of logical identities assignable to the first LAG member according to the weight associated with the first LAG member; and
   distributing the packet, by a network traffic distributing device, to the first LAG member if the packet's logical identity falls into the range of logical identities assignable to the first LAG member,
   wherein the determining further comprises: determining a logical identity boundary for the first LAG member,
   wherein the number of logical identities assignable to the second LAG member is a difference between boundaries of the first LAG member and the second LAG member,
   wherein the boundary of the range of logical identities is determined using the following equation:

$R_i = R_{i-1} W_i * 2^n / W$, and wherein i is an LAG member number;
   $R_i$ is a boundary value associated with an LAG member i;
   $W_i$ is a weight associated with an LAG member i:
   n is the hash index width; and
   W is the sum of all $W_i$'s associated with valid LAG members.

2. The method of claim 1, wherein the logical identity of the packet is a hash index of the packet's header.

3. The method of claim 1, further comprising: storing the weight in a configurable LAG attribute table.

4. The method of claim 1, wherein the number of logical identities assignable to the first LAG member is approximately proportional to the weight associated with the first LAG member.

5. The method of claim 1, further comprising: storing the boundary of the range of logical identities into an LAG attribute table.

6. The method of claim 2, wherein the hash index's width is 8 bits.

7. The method of claim 1, wherein the first LAG member is a physical port.

8. The method of claim 1, wherein the first LAG member is a physical link.

9. The method of claim 1, further comprising: determining an LAG number from the header of the packet.

10. The method of claim 1, further comprising: if the packet's logical identity does not fall into the range of logical identities assignable to the first LAG member, determining whether the packet's logical identity falls into the range of logical identities assignable to the second LAG member.

11. A method for weighted load-balancing traffic among a plurality of network interfaces, comprising:
    generating a logical identity of a packet;
    associating a weight with each network interface, the weight corresponding to a percentage of network traffic that is to be assigned to the network interface;
    determining a range of logical identities assignable to the network interface according to the weight associated with the network interface;
    distributing the packet, by a network traffic distributing device, to the network interface if the packet's logical identity falls into the range of logical identities assignable to the network interface, and
    determining a logical identity boundary for the network interface using the following equation:

$R_i = R_{i-1} + W_i * 2^n / W$ wherein i is a network interface number;
    $R_i$ is a boundary value associated with a network interface i;
    W is a weight associated with a network interface i;
    n is the hash index width; and
    W is the sum of all $W_i$'s associated with valid network interfaces.

12. The method of claim 11, wherein the network interface is used for WCMP (Weighted Cost MultiPath) selection.

13. The method of claim 11, wherein the network interface is an LAG member.

14. A device for distributing network traffic, comprising:
    at least one input port for receiving packets;
    at least two output ports for transmitting packets; and
    a control module for distributing packets received at the input port among the output ports, wherein the control module:
    generates a logical identity of a packet;
    associates a weight with each output port, the weight corresponding to a percentage of network traffic that is to be assigned to the output port;
    determines a range of logical identities assignable to the output port according to the weight associated with the output port; and
    distributes the packet to the output port if the packet's logical identity falls into the range of logical identities assignable to the output port, and
    determining a logical identity boundary for an output port using the following equation:

$R_i = R_{i-1} + W_i * 2^n / W$ wherein i is an output port number;
    $R_i$ is a boundary value associated with an output port;
    $W_i$ is a weight associated with an output port i;
    n is the hash index width; and
    W is the sum of all W's associated with valid output ports.

15. The device of claim 14, wherein the at least two output ports are LAG members.

16. The device of claim 14, wherein the at least two output ports are on paths for WCMP (Weighted Cost MultiPath)/TRILL (Transparent Interconnection of Lots of Links) selection.

17. A computer program product comprising a non-transitory computer-readable medium having computer-executable instructions which, when executed on a computer, perform the method of claim 1.

18. A computer program product comprising a non-transitory computer-readable medium having computer-executable instructions which, when executed on a computer, perform the method of claim 2.

19. A computer program product comprising a non-transitory computer-readable medium having computer-executable instructions which, when executed on a computer, perform the method of claim 3.

* * * * *